(12) United States Patent
Lakhoua et al.

(10) Patent No.: US 11,194,175 B2
(45) Date of Patent: Dec. 7, 2021

(54) METHOD FOR PROVIDING A SELECTION CHART OF NONPRESCRIPTION OPHTHALMIC LENSES

(71) Applicant: Essilor International, Charenton-le-Pont (FR)

(72) Inventors: Asma Lakhoua, Charenton-le-Pont (FR); Fabien Muradore, Charenton-le-Pont (FR); Sebastien Fricker, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 288 days.

(21) Appl. No.: 16/461,665

(22) PCT Filed: Oct. 26, 2017

(86) PCT No.: PCT/EP2017/077422
§ 371 (c)(1),
(2) Date: May 16, 2019

(87) PCT Pub. No.: WO2018/099656
PCT Pub. Date: Jun. 7, 2018

(65) Prior Publication Data
US 2019/0353927 A1    Nov. 21, 2019

(30) Foreign Application Priority Data
Nov. 30, 2016  (EP) .................................... 16306583

(51) Int. Cl.
*G02C 7/02* (2006.01)
(52) U.S. Cl.
CPC ............. *G02C 7/028* (2013.01); *G02C 7/027* (2013.01); *G02C 2202/08* (2013.01)

(58) Field of Classification Search
CPC ........ G02C 7/028; G02C 7/024; G02C 7/027; G02C 2202/08
See application file for complete search history.

(56) References Cited

U.S. PATENT DOCUMENTS

| 6,318,859 B1 | 11/2001 | Baudart et al. |
| 2003/0169397 A1* | 9/2003 | Reichow .................. G02C 7/02 351/159.16 |

(Continued)

FOREIGN PATENT DOCUMENTS

| EP | 2 028 527 A1 | 2/2009 |
| EP | 2 246 729 A1 | 11/2010 |

OTHER PUBLICATIONS

International Search Report dated Jan. 19, 2018 in PCT/EP2017/077422 filed Oct. 26, 2017.

*Primary Examiner* — Cara E Rakowski
(74) *Attorney, Agent, or Firm* — Oblon, McClelland, Maier & Neustadt, L.L.P.

(57) ABSTRACT

A method is provided for providing a selection chart of non-prescription ophthalmic lenses. The method comprises providing at least one optical performance parameter threshold (OPPT) associated to an optical performance parameter (OPP); choosing the selection criterion (SC) among the selection criteria of the list consisting of: lens base curve; lens pantoscopic angle; and lens wrap angle; choosing a selection criterion range (SCR) for each of the chosen selection criterion; calculating selection domains (SD) defined by sub-ranges for each of the chosen SC within the SCR so as to determine and associate in each SD a single non-prescription ophthalmic lens with a spherical front surface, a complex back surface and a lens base curve. All the chosen OPPs are equal or less to the OPPT for all values of the SC within the SD associated to the single non-prescription ophthalmic lens.

14 Claims, 17 Drawing Sheets

(56) References Cited

U.S. PATENT DOCUMENTS

| | | |
|---|---|---|
| 2010/0283966 A1 | 11/2010 | Colas et al. |
| 2011/0205626 A1 | 8/2011 | Saylor et al. |
| 2012/0188504 A1 | 7/2012 | Petignaud et al. |
| 2012/0307194 A1 | 12/2012 | Croft et al. |
| 2015/0293377 A1 | 10/2015 | Allione et al. |

\* cited by examiner

METHOD FOR PROVIDING A SELECTION CHART OF NONPRESCRIPTION OPHTHALMIC LENSES

The invention relates generally to the field of vision improvement and more specifically concerns a method for providing a selection chart of non-prescription ophthalmic lenses. It also relates to a set of non-prescription ophthalmic lenses associated to a selection chart.

Non-prescription ophthalmic lenses are ophthalmic lenses that can be obtained without a prescription from an eye-care professional. Accordingly, such ophthalmic lenses are devoid of any prescribed vision correction, such as for example prescribed far vision correction, prescribed intermediate vision correction, prescribed near vision correction, prescribed astigmatism correction. Non-prescription ophthalmic lenses are also commonly called "plano lenses". Non-prescription ophthalmic lenses are used in a variety of eye-wear, such as sunglasses, protective glasses and goggles (e.g., ski goggles, motorcycle goggles).

Non-prescription ophthalmic lenses, especially sunglasses, often have geometry with front face curvatures, also called lens base curves, which can be significantly greater than those of standard ophthalmic lenses; this is due to the fact that customers appreciate wearing sunglasses that cover a large part of their face thanks to sunglasses spectacle frames which are significantly curved. Furthermore non-prescription ophthalmic lenses can often be used according to a plurality of conditions depending for example of wearing conditions.

The inventors have noticed that current non-prescription ophthalmic lenses may suffer from optical aberrations that may be detrimental for the wearer's comfort, namely when said lenses are intended to be used in various conditions depending for example of wearing conditions and/or of the non-prescription ophthalmic lens base curve.

A solution could be defining a non-prescription ophthalmic lens by taking into account the said various conditions for each given wearer when ordering such a lens, for example thanks to an optimization process. Such a method would nevertheless involve manufacturing a specific non-prescription ophthalmic lens for each lens order. It would also be time consuming and expensive.

A problem that the invention aims to solve is to enhance visual comfort of non-prescription ophthalmic lens' wearers thanks to a cost effective method which can easily be implemented.

For this purpose, a subject of the invention is a method for providing a selection chart of non-prescription ophthalmic lenses, implemented by computer means, according to at least a selection criterion (SC), the method comprising following steps:

providing at least one optical performance parameter threshold (OPPT) associated to an optical performance parameter (OPP);

choosing the selection criterion(a) (SC) among the selection criteria of the list consisting of: lens base curve; lens pantoscopic angle; lens wrap angle;

choosing a selection criterion range (SCR) for each of the chosen selection criterion;

calculating selection domains (SD) defined by sub-ranges for each of the chosen selection criterion (SC) within the selection criterion range (SCR) so as to determine and associate in each selection domain (SD) a single non-prescription ophthalmic lens with a spherical front surface, a complex back surface and a lens base curve, where all the chosen optical performance parameter(s) (OPP) are equal or less to the optical performance parameter threshold (OPPT) for all values of the selection criterion (SC) within the selection domain (SD) associated to said single non-prescription ophthalmic lens.

Thanks to the present invention, one provides a selection chart which is suitable for offering non-prescription ophthalmic lenses that have enhanced visual comfort according to wearer's needs. A relevant non-prescription ophthalmic lens can then be chosen thanks to said selection chart for a given frame chosen by a wearer in a selection domain of the selection chart where the selection domain corresponds to selected criteria. According to the present invention, each selection domain of the selection chart is associated to a single non-prescription ophthalmic lens with a spherical front surface, a complex back surface and a lens base curve; non-prescription ophthalmic lenses associated to the selection chart are thus limited to a finished number of units.

According to different embodiments of the present invention, that may be combined:

optical performance parameters (OPP) are chosen within the list consisting of: PPO(0,0); PPO(0,30); ASR(0,0); ASR(0,30); HPD(0,0); VDP(0,0); where PPO($\alpha,\beta$) is the mean refractive power, ASR($\alpha,\beta$) is the module of resulting astigmatism, HPD($\alpha,\beta$) is the horizontal prismatic deviation (in Prismatic Diopters) and VPD($\alpha,\beta$) is the vertical prismatic deviation (in Prismatic Diopters), said ($\alpha,\beta$) functions being determined in as-worn conditions of the lens by the wearer for gaze directions ($\alpha,\beta$) joining the center of rotation of the eye, CRE, and the lens, where $\alpha$ is a lowering angle in degree and $\beta$ is an azimuth angle in degree and where as-worn conditions refer at least to a lens pantoscopic angle and/or a lens wrap angle; according to an embodiment, a plurality of optical performance parameters (OPP) are chosen within the list consisting of: PPO(0,30); ASR(0,30); HPD(0,0); VDP(0,0); according to an embodiment, the optical performance parameter threshold (OPPT) is 0.1 D when it is associated to either PPO(0,0); PPO(0,30); ASR(0,0); ASR(0,30), and the optical performance parameter threshold (OPPT) is 0.2 PD when it is associated to either HPD(0,0); VDP(0,0);

the lens base curve is not a selection criterion, wherein a reference lens base curve value is provided and the selection domains (SD) are calculated so that the difference between the lens base curve of the single non-prescription ophthalmic lens in each selection domain (SD) and the reference lens base curve value is less than or equal to 2 diopters, for example is less than or equal to 1 diopter;

the selection criterion range (SCR) for a selection criterion is chosen according to following rules:
a 3 D to 9 D, for example 5 D to 8 D, when the selection criterion is the lens base curve;
−20° to 0° when the selection criterion is the lens pantoscopic angle;
10° to 30° when the selection criterion is the lens wrap angle;

the selection domains (SD) calculating step comprises an optimization routine for determining the minimum number of selection domains that fulfil the required conditions and simultaneously determining the front surface and the complex back surface of the single non-prescription ophthalmic lens in each selection domain (SD);

data are associated to the non-prescription ophthalmic lenses of the selection domains so as to provide marking positions for indicating a fitting point and defining a temporal and/or a nasal area.

In another aspect, the present invention also provides a method for manufacturing non-prescription ophthalmic lenses according to the here above mentioned selection chart comprising a step of injecting or of molding at least one of the determined non-prescription ophthalmic lens, for example of each of the determined non-prescription ophthalmic lenses.

In still another aspect, the present invention provides a method of selecting a non-prescription ophthalmic lens within the here above mentioned selection chart comprising providing geometrical features of a frame to which the non-prescription ophthalmic lens is intended to be mounted and providing rules between the geometrical features of the frame and the selection criterion(a) of the selection chart. According to an embodiment, the geometrical features of the frame are chosen within the list consisting of a frame pantoscopic angle; a frame wrap angle; a frame base curve. According to an embodiment, the rules between the geometrical features of the frame and the selection criterion(a) are following:

One selects a non-prescription ophthalmic lens having a lens pantoscopic angle equal to the frame pantoscopic angle; and/or, One selects a non-prescription ophthalmic lens having a lens wrap angle equal to the frame wrap angle; and/or, One selects a non-prescription ophthalmic lens having a lens base curve equal to the frame base curve.

The present invention also relates to a computer program product comprising one or more stored sequence of instruction that is accessible to a processor and which, when executed by the processor, causes the processor to carry out the steps of here above recited method for providing a selection chart. It also relates to a computer program product that causes the processor to carry out the steps of here above recited method for manufacturing non-prescription ophthalmic lenses. It also relates to a computer program product that causes the processor to carry out the steps of here above recited method of selecting a non-prescription ophthalmic lens within the selection chart. The present invention also relates to computer-readable media carrying one or more sequences of instructions of the here above recited computer program products.

In another aspect, the present invention also provides a set of non-prescription ophthalmic lenses with a spherical front surface, a complex back surface and a lens base curve associated to a selection chart, wherein the selection chart comprises at least one selection criterion(a) (SC) among the selection criteria of the list consisting of: lens base curve; lens pantoscopic angle; lens wrap angle; wherein a selection criterion range (SCR) is provided for each selection criterion (a) (SC) and selection domains (SD) are provided within the selection criterion range(s) so as a single non-prescription ophthalmic lens is associated to each of the selection domains. According to an embodiment, each non-prescription ophthalmic lens fulfils at least a chosen optical performance parameter (OPP) which is (are) equal or less to an optical performance parameter threshold (OPPT) for all values of the selection criterion(a) within the selection domain (SD) associated to each of the single non-prescription ophthalmic lenses.

BRIEF DESCRIPTION OF THE DRAWINGS

The features of the present invention, as well as the invention itself, both as to its structure and its operation, will be best understood from the accompanying non limiting drawings and examples, taken in conjunction with the accompanying description, in which.

DEFINITIONS

Figure 1:
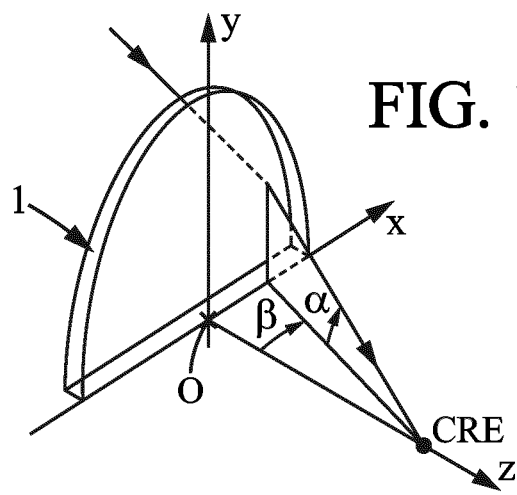
FIGS. 1 and 2 show, diagrammatically, optical systems of eye and lens and ray tracing from the center of rotation of the eye.
Figure 2:
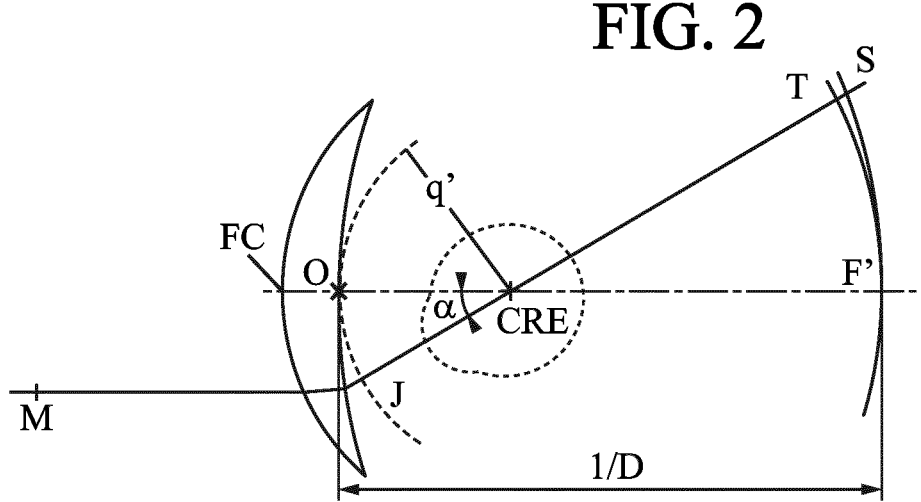

Following definition are given within the frame of the present invention, but usually refer to standard definitions in the field of ophthalmic lenses, where:

A "gaze direction" is identified by a couple of angle values $(\alpha,\beta)$, wherein said angles values are measured with regard to reference axes centered on the center of rotation of the eye, commonly named as "CRE". More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled CRE. The axis CRE-F', shown on FIG. 2 in a dot-dash line, is the horizontal axis passing through the center of rotation of the eye and extending in front of the wearer—that is the axis CRE-F' corresponding to the primary gaze direction. The lens is placed and centered in front of the eye such that the axis CRE-F' cuts the front surface of the lens on a point called the fitting cross, which is, in general, present on lenses to enable the positioning of lenses in a frame by an optician. The point of intersection of the rear surface of the lens and the axis CRE-F' is the point, O. A vertex sphere, which center is the center of rotation of the eye, CRE, and has a radius q'=O-ORE, intercepts the rear surface of the lens in a point of the horizontal axis. A value of radius q' of 25.5 mm corresponds to a usual value and provides satisfying results when wearing the lenses. Other value of radius q' may be chosen. A given gaze direction, represented by a solid line on FIG. 1, corresponds to a position of the eye in rotation around CRE and to a point J (see FIG. 2) of the vertex sphere; the angle $\beta$ is the angle formed between the axis CRE-F' and the projection of the straight line CRE-J on the horizontal plane comprising the axis CRE-F'; this angle appears on the scheme on FIG. 1. The angle $\alpha$ is the angle formed between the axis CRE-J and the projection of the straight line CRE-J on the horizontal plane comprising the axis CRE-F'; this angle appears on the scheme on FIGS. 1 and 2. A given gaze view thus corresponds to a point J of the vertex sphere or to a couple $(\alpha,\beta)$. The more the value of the lowering gaze angle is positive, the more the gaze is lowering and the more the value is negative, the more the gaze is rising. In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

For each gaze direction $(\alpha,\beta)$, a mean refractive power $PPO(\alpha,\beta)$, a module of astigmatism $ASR(\alpha,\beta)$ and an axis $AXE(\alpha,\beta)$ of this astigmatism are defined.

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis; in the present matter directed to non-prescription ophthalmic lenses, the prescribed astigmatism is nil and "astigmatism" refers to astigmatism generated by the lens;

"Ergorama" is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value towards the nasal side, the object distance is of the order of 30 to 50 cm. For more details concerning a possible definition of an ergorama, US patent U.S. Pat. No. 6,318,859 may be considered. This document describes an ergorama, its definition and its modeling method. For a method of the invention, points may be at infinity or not. Ergorama may be a function of the wearer's ametropia. Using these elements, it is possible to define a wearer optical power and astigmatism, in each gaze direction. An object point M at an object distance given by the ergorama is considered for a gaze direction $(\alpha,\beta)$. An object proximity ProxO is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power PPO as the sum of the image proximity and the object proximity.

$$PPO = ProxO + ProxI$$

The optical power is also called refractive power.
With the same notations, an astigmatism AST is defined for every gaze direction and for a given object proximity as:

$$AST = \left|\frac{1}{JT} - \frac{1}{JS}\right|$$

This definition corresponds to the astigmatism of a ray beam created by the lens. The resulting astigmatism ASR is defined for every gaze direction through the lens as the difference between the actual astigmatism value AST for this gaze direction and the prescribed astigmatism for the same lens (as here above mentioned, the prescribed astigmatism is nil for the present case). The residual astigmatism (resulting astigmatism) ASR more precisely corresponds to module of the vectorial difference between actual (AST, AXE) and prescription data $(CYL_p, AXIS_p) = (0,0)$.

When the characterization of the lens is of optical kind, it refers to the ergorama-eye-lens system described above. For simplicity, the term 'lens' is used in the description but it has to be understood as the 'ergorama-eye-lens system'. The values in optic terms can be expressed for gaze directions. Conditions suitable to determine of the ergorama-eye-lens system are called in the frame present invention "as-worn conditions".

In the remainder of the description, terms like «up», «bottom», «horizontal», «vertical», «above», «below», or other words indicating relative position may be used. These terms are to be understood in the wearing conditions of the lens. Notably, the "upper" part of the lens corresponds to a negative lowering angle $\alpha<0°$ and the "lower" part of the lens corresponds to a positive lowering angle $\alpha>0°$.

"prismatic deviation" is defined in the object space by the angular deviation of a ray issued from the center of rotation of the eye introduced by the quantity of prism of the lens; $HPD(\alpha,\beta)$ is the horizontal component of the prismatic deviation (in Prismatic Diopters) and $VPD(\alpha,\beta)$ is the vertical component of the prismatic deviation (in Prismatic Diopters).

"Non-prescription ophthalmic lens", also called "plano lenses" are ophthalmic lenses that are devoid of any prescribed vision correction; (see INTERNATIONAL STANDARD—ISO 13666:2012—Ophthalmic optics—Spectacle lenses—Vocabulary; § 8.2.3: Plano lens: lens with nominally zero dioptric power). For a person skilled in the art, the mean refractive power of such a lens is characterized by following equation: $-0.12\ D \leq PPO(0,0) \leq 0.12$; said non-prescription ophthalmic lenses are intended to be arranged within a spectacle frame; according to an embodiment, non-prescription ophthalmic lenses are solar lenses;

"Complex surface" is a surface of an ophthalmic lens which is non-spherical, non-toroidal, non-sphero toroidal; For example a surface with a sphere variation greater than 0.12D is considered as being a complex surface.

"Lens base curve" is the nominal surface power (or nominal curvature) of the front surface (see ISO 13666: 2012—§ 11.4). The assumed refractive index for surface power measurement is 1.53.

"Lens pantoscopic angle", also called "as-worn" pantoscopic angle" is the angle in the vertical plane between the normal to the front surface of the spectacle lens at its boxed center and the line of sight of the eye in the primary position, usually taken to be the horizontal; (see ISO 13666:2012—§ 5.18).

"Wrap angle" of a lens is the angle in the horizontal plane between the normal to the front surface of the spectacle lens at its boxed centre and the line of sight of the eye in the primary position, usually taken to be straight ahead.

EXAMPLES

In each of FIGS. 5 to 19, "LPA" refers to the lens pantoscopic angle and "LWA" refers to the lens wrap angle; LPA and LWA are angles expressed in degree; in each of FIGS. 5 to 17, one represents the variation of a parameter according to an abscissa which is the lens wrap angle within a chosen range and according to an ordinate which is the lens pantoscopic angle within a chosen range.

FIGS. 3 to 10 give optical characteristics of a non-prescription ophthalmic lens determined and designed according to a known optimization method; said lens has been designed so as to have a lens base curve of 8 D; a refractive index of 1.59 corresponding to polycarbonate; it has been designed so as to fit a spectacle frame which height is 45 mm and width is 65 mm. It has been optimized with thickness targets where the thickness at the center of the lens is 3 mm and the thickness at the edge is 1 mm. The lens of FIGS. 3 to 10 is here after called the "Reference lens".

Figure 3:
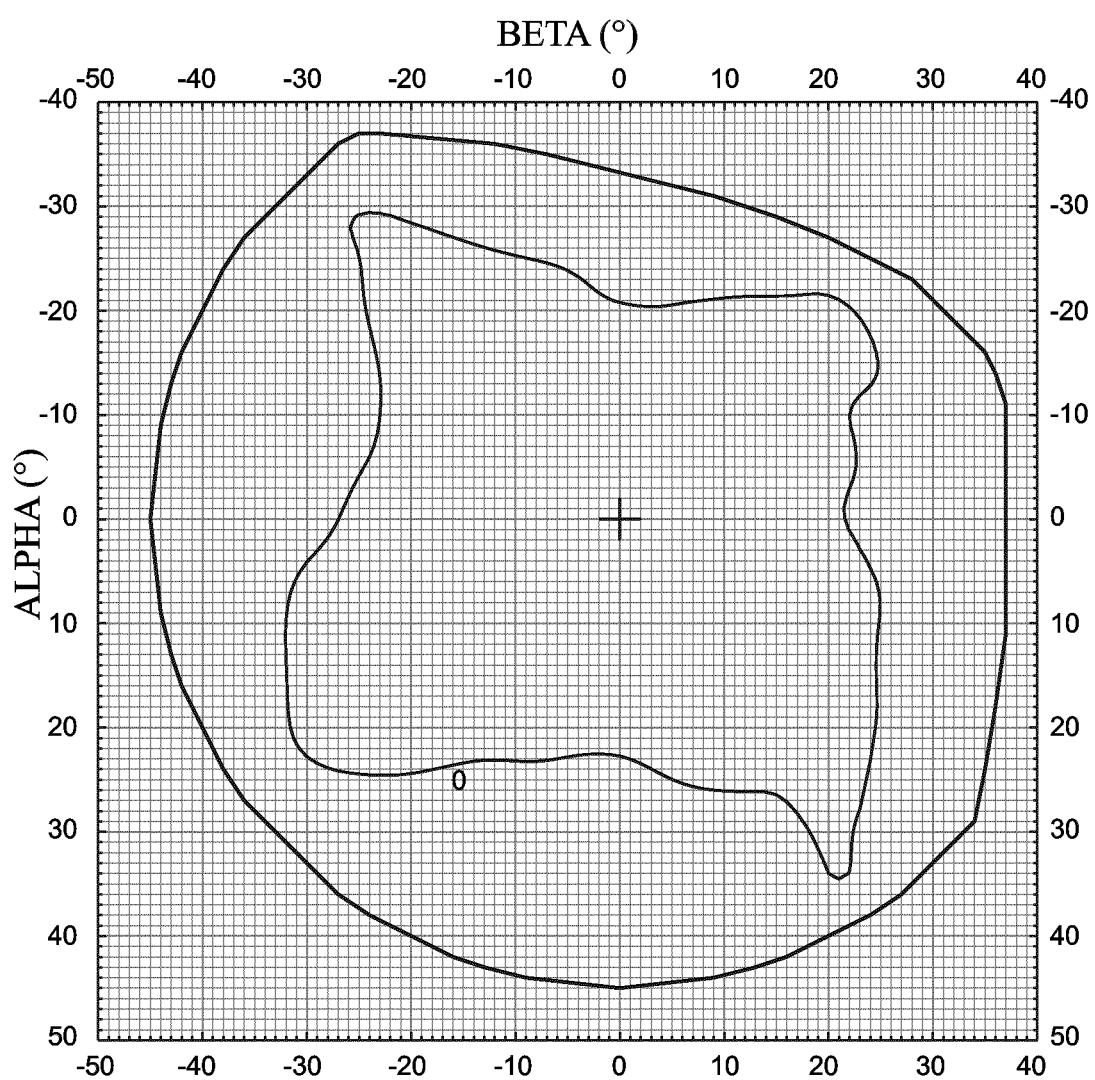
FIGS. 3 to 10 give optical characteristics of a non-prescription ophthalmic lens determined according to a prior art method.
Figure 4:
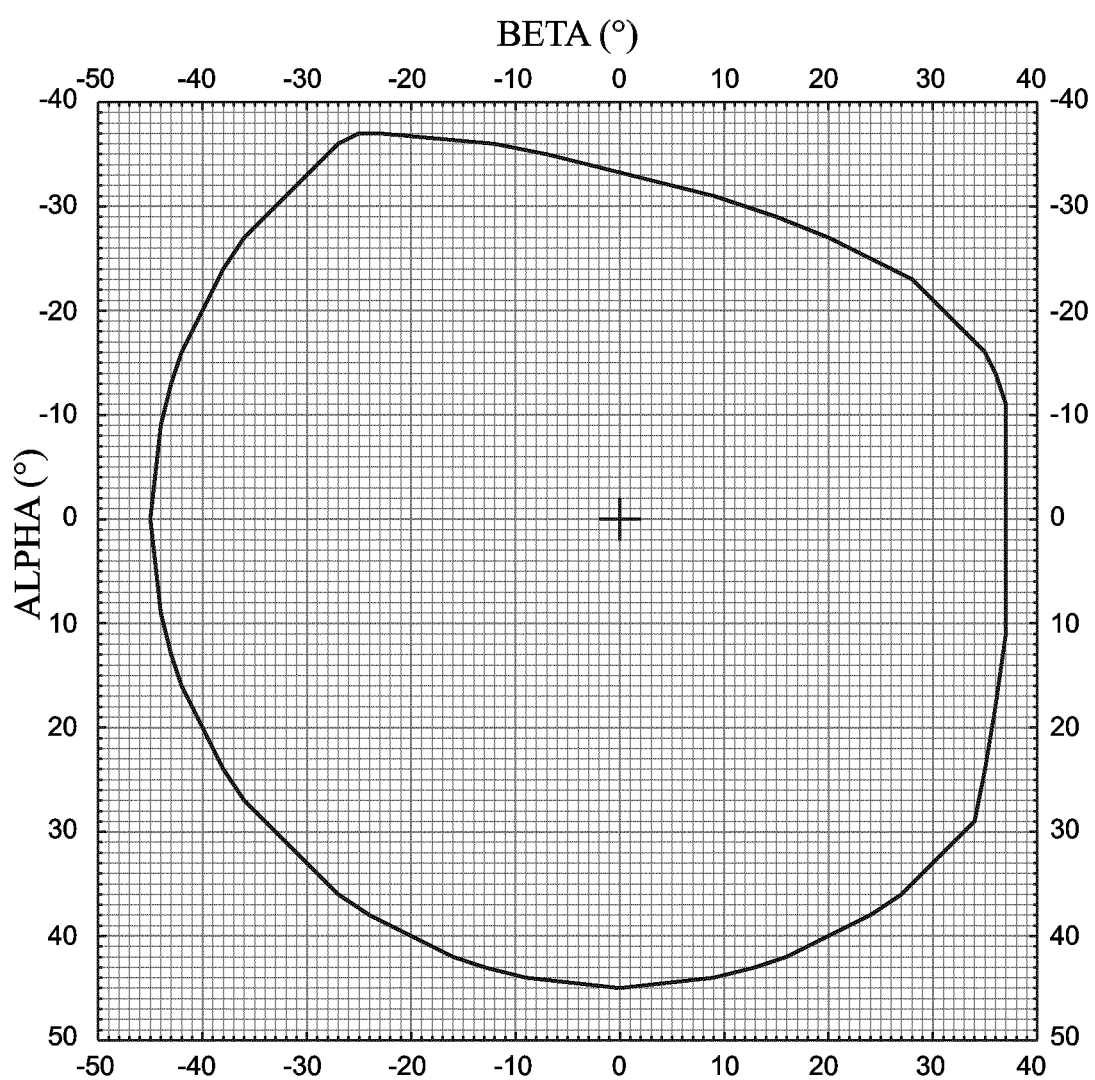

The external contour on FIGS. 3 and 4 corresponds to the viewed external edge of the Reference lens; the central cross corresponds to the fitting point gaze direction for said lens.

FIG. 3 shows the optical power $PPO(\alpha,\beta)$ variation as a function of the wearer gaze directions $(\alpha,\beta)$. The curve inside the viewed external edge is an ISO-line where $PPO(\alpha,\beta)=0$ D.

FIG. 4 shows the resulting astigmatism $ASR(\alpha,\beta)$ variation as a function of the wearer gaze directions $(\alpha,\beta)$. Said figure shows that the resulting astigmatism is very low all over the $(\alpha,\beta)$ range and less than 0.1 D.

Optical features of the Reference lens shown in FIGS. 3 and 4 have been calculated for a lens pantoscopic angle equal to $-10°$ and a lens wrap angle equal to $+20°$.

The Reference lens, as illustrated by FIGS. 3 and 4, is considered as being a good non-prescription ophthalmic lens according to commonly used standards.

Nevertheless the inventors have demonstrated that such a Reference lens may has some drawbacks that are linked to optical aberrations namely when said lens is intended to be used in various conditions depending for example of wearing conditions and/or of the non-prescription ophthalmic lens base curve; said optical aberrations may be detrimental for the wearer's comfort.

In the present example as illustrated by FIGS. 5 to 10, the influence of both the lens pantoscopic angle and of lens wrap angle has been studied for several optical features. On said figures, the variation range of the lens pantoscopic angle is between 0° and $-20°$ and the variation range of the lens wrap angle is between $+10°$ and $+30°$. Said variation ranges substantially correspond to possible usual wearing conditions.

Figure 5:
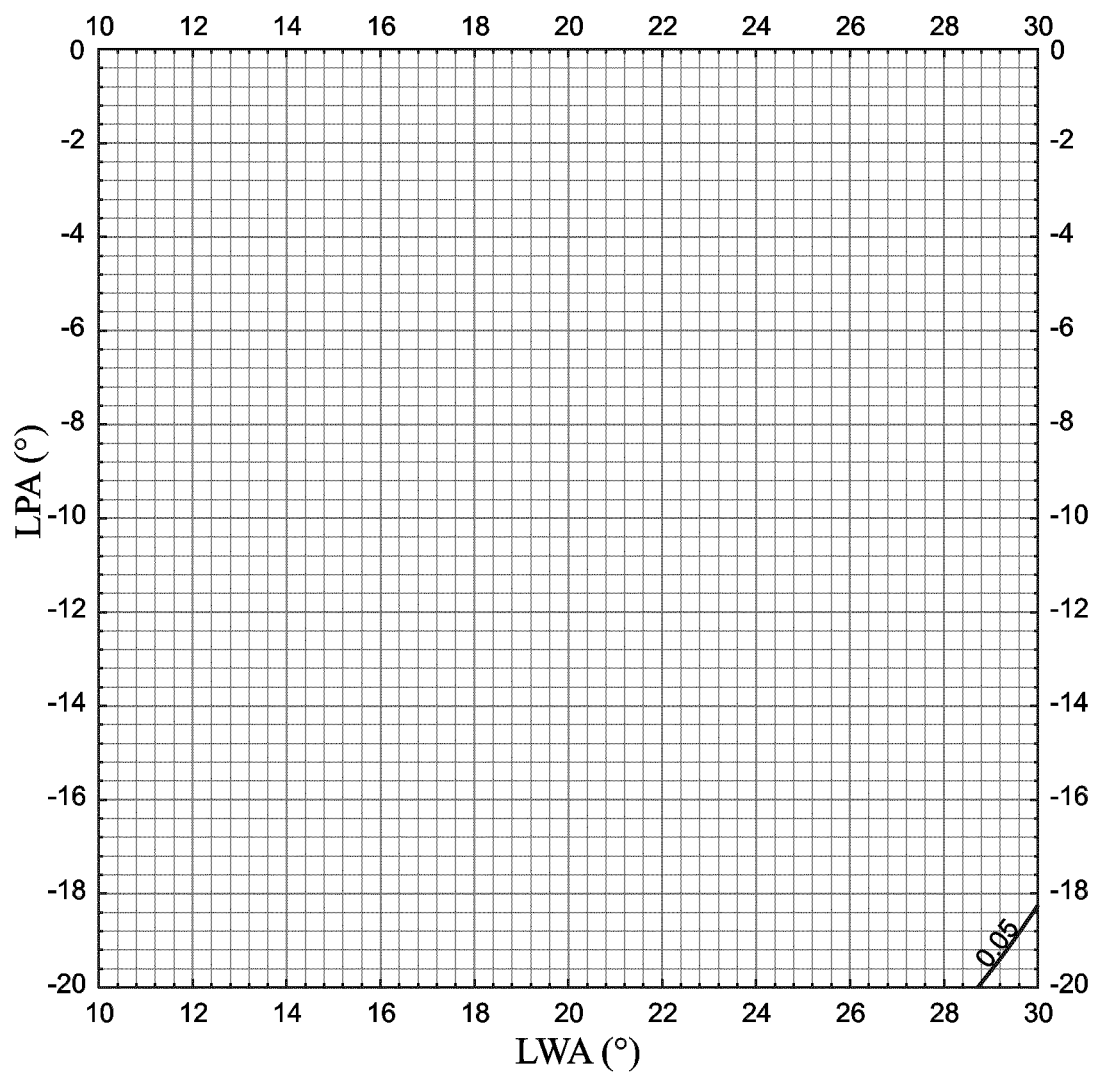

FIG. 5 shows the optical power $PPO(0,0)$ variation, thus the variation of the optical power according to the central gaze direction, according to both the lens pantoscopic angle and the lens wrap angle. It appears from this figure that the optical power according to the central gaze direction of the Reference lens is close to nil all over the lens pantoscopic angle and the lens wrap angle studied domain. Such a performance is satisfactory.

Figure 6:
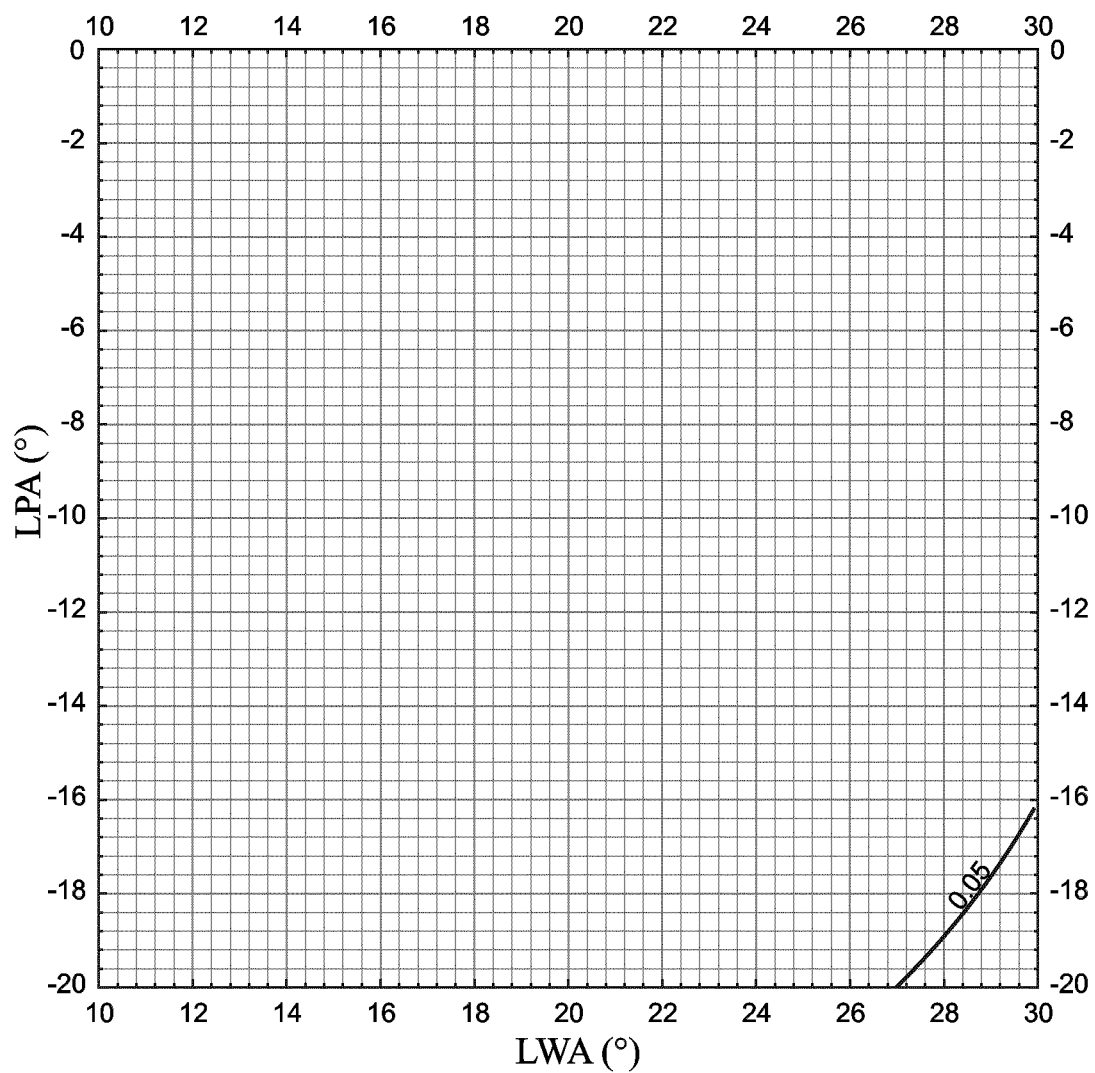

FIG. 6 shows the resulting astigmatism $ASR(0,0)$ variation, thus the variation of the resulting astigmatism according to the central gaze direction, according to both the lens pantoscopic angle and the lens wrap angle. It appears from this figure that the resulting astigmatism according to the central gaze direction of the Reference lens is close to nil all over the lens pantoscopic angle and the lens wrap angle studied domain. Such a performance is satisfactory.

Figure 7:
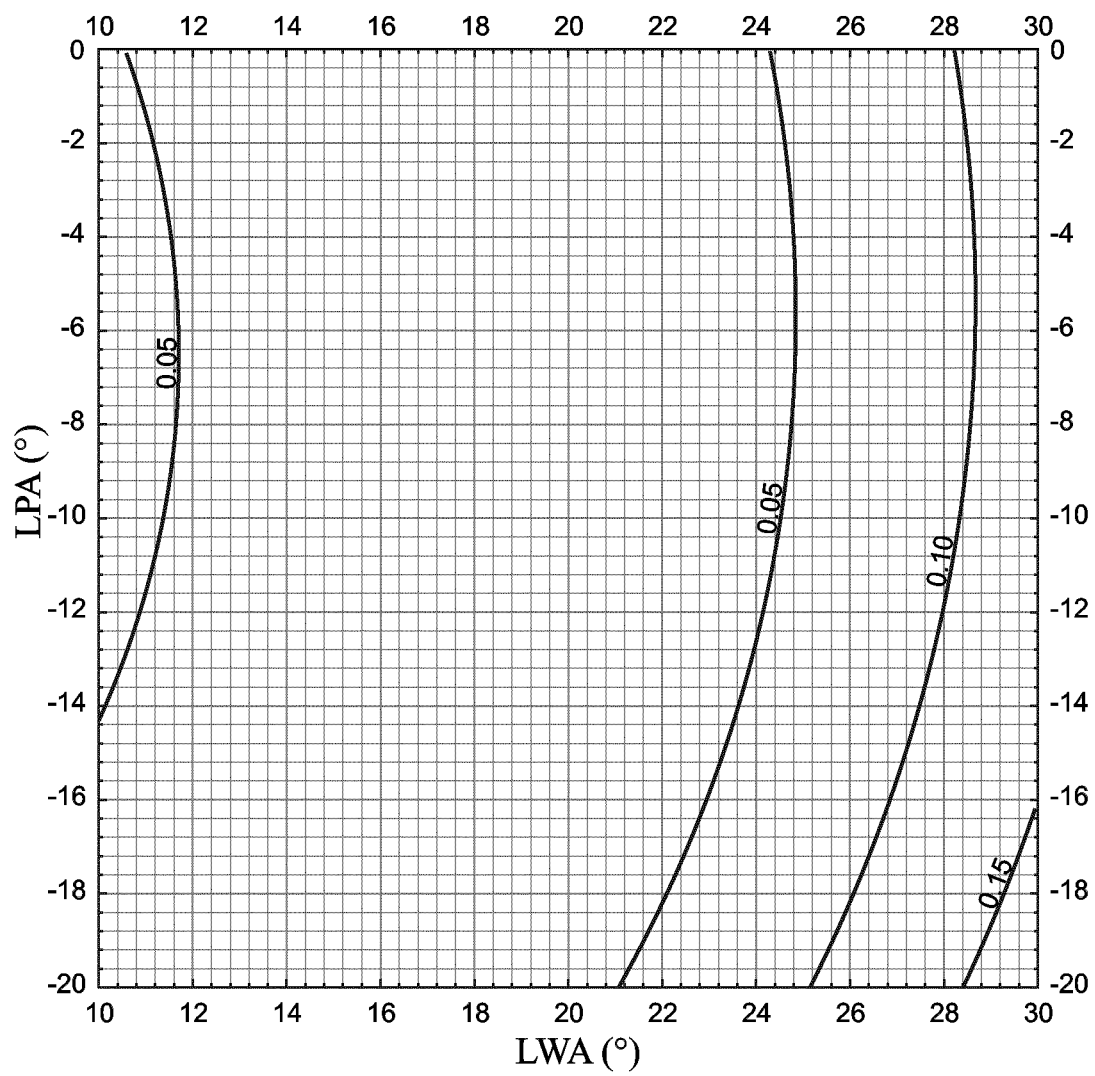

FIG. 7 shows the optical power $PPO(0,30)$ variation, thus the variation of the optical power according to a lateral gaze direction, according to both the lens pantoscopic angle and the lens wrap angle. It appears from this figure that the optical power according to a lateral gaze direction of the Reference lens varies over the lens pantoscopic angle and the lens wrap angle studied domain. It significantly increases when the lens wrap angle increases. Such a performance is not fully satisfactory.

Figure 8:
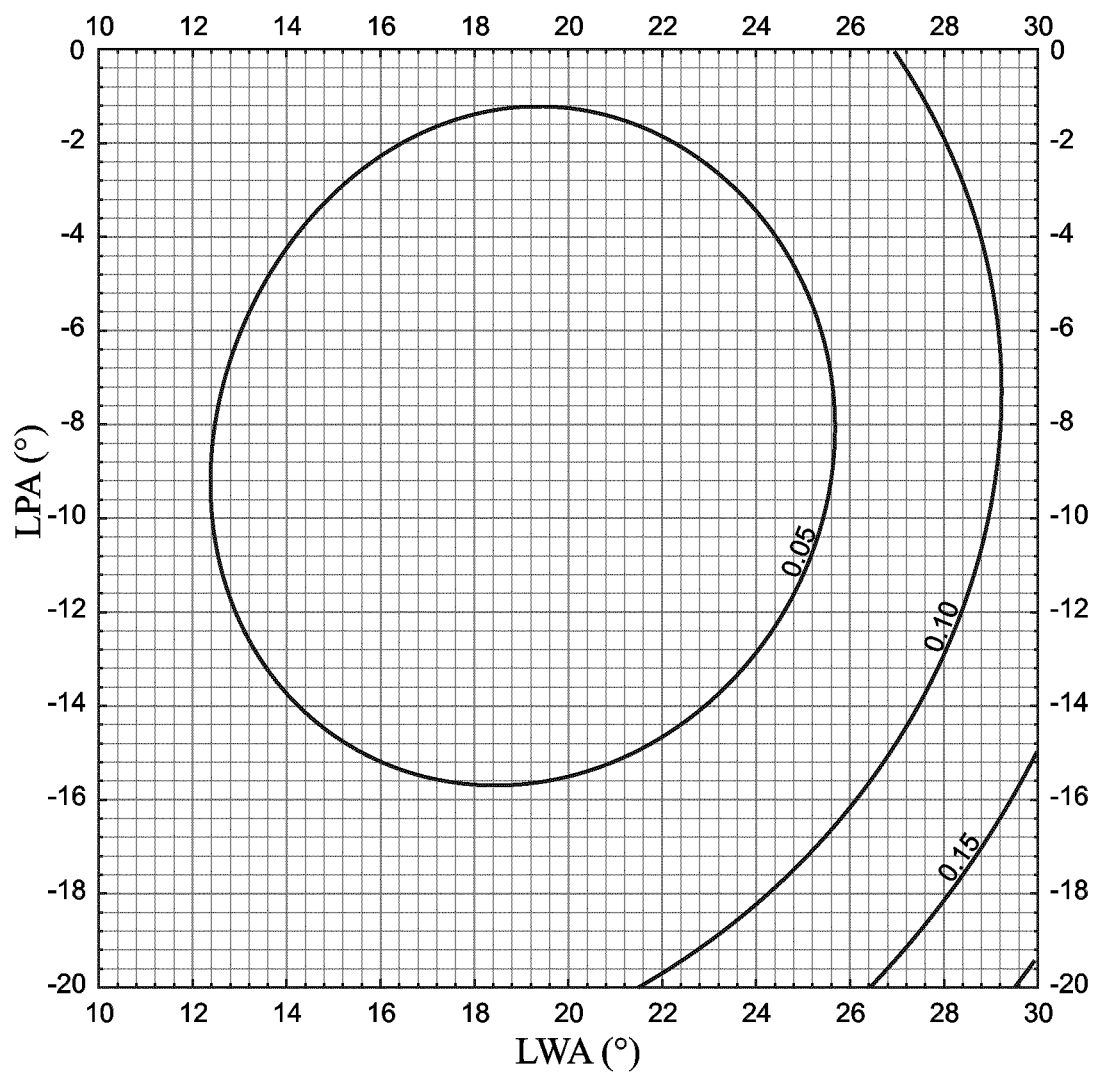

FIG. 8 shows the resulting astigmatism $ASR(0,30)$ variation, thus the variation of the resulting astigmatism according to a lateral gaze direction, according to both the lens pantoscopic angle and the lens wrap angle. It appears from this figure that the resulting astigmatism according to a lateral gaze direction of the Reference lens varies over the lens pantoscopic angle and the lens wrap angle studied domain. It significantly increases when the lens wrap angle increases. Such a performance is not fully satisfactory.

Figure 9:
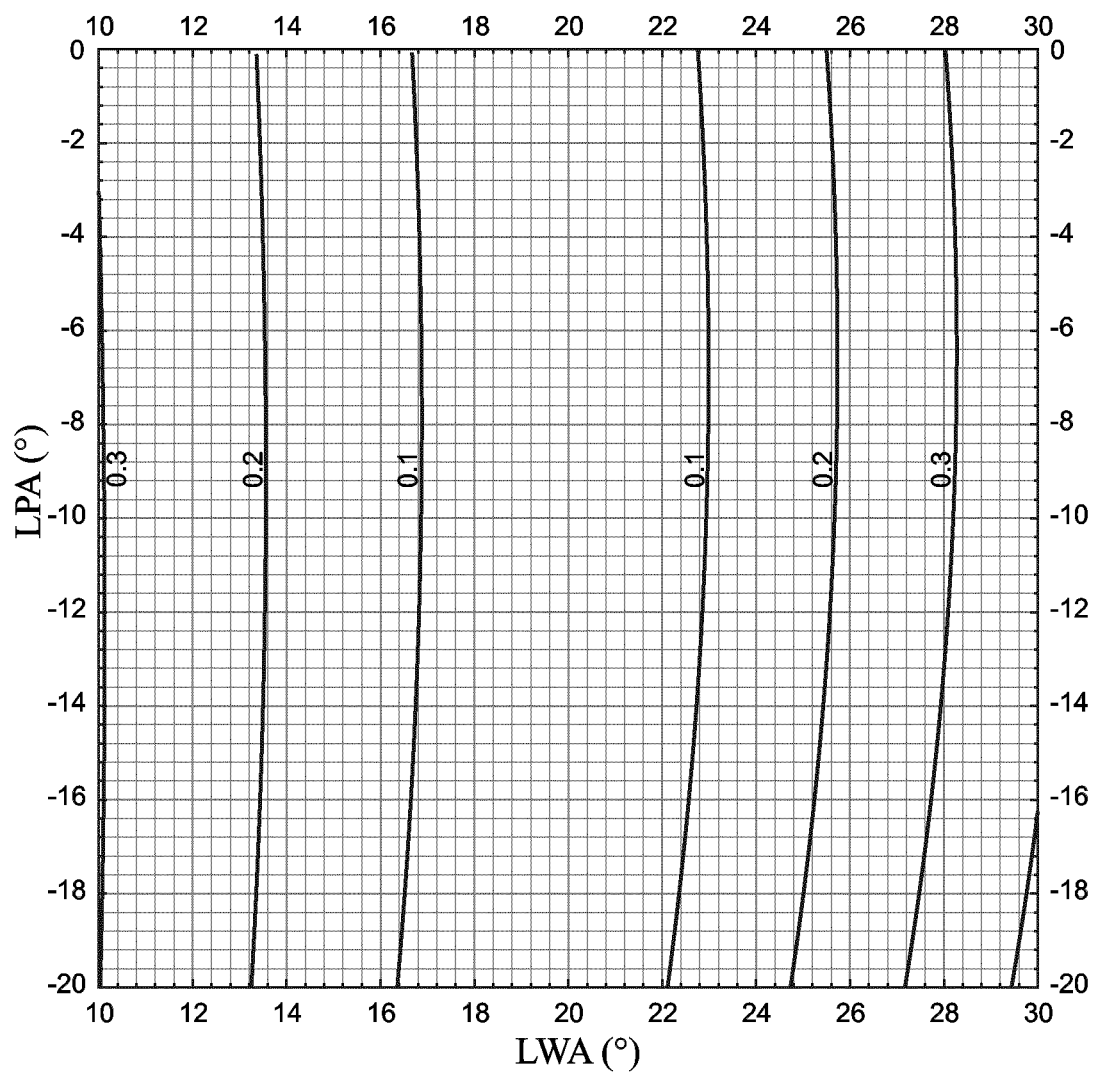

FIG. 9 shows the horizontal prismatic deviation (in Prismatic Diopters) variation $HPD(0,0)$, thus the variation of the horizontal prismatic deviation according to the central gaze direction, according to both the lens pantoscopic angle and the lens wrap angle. It appears from this figure that the horizontal prismatic deviation according to the central gaze direction of the Reference lens varies over the lens pantoscopic angle and the lens wrap angle studied domain. It significantly increases when the lens wrap angle increases and when the lens wrap angle decreases. Such a performance is not fully satisfactory.

Figure 10:
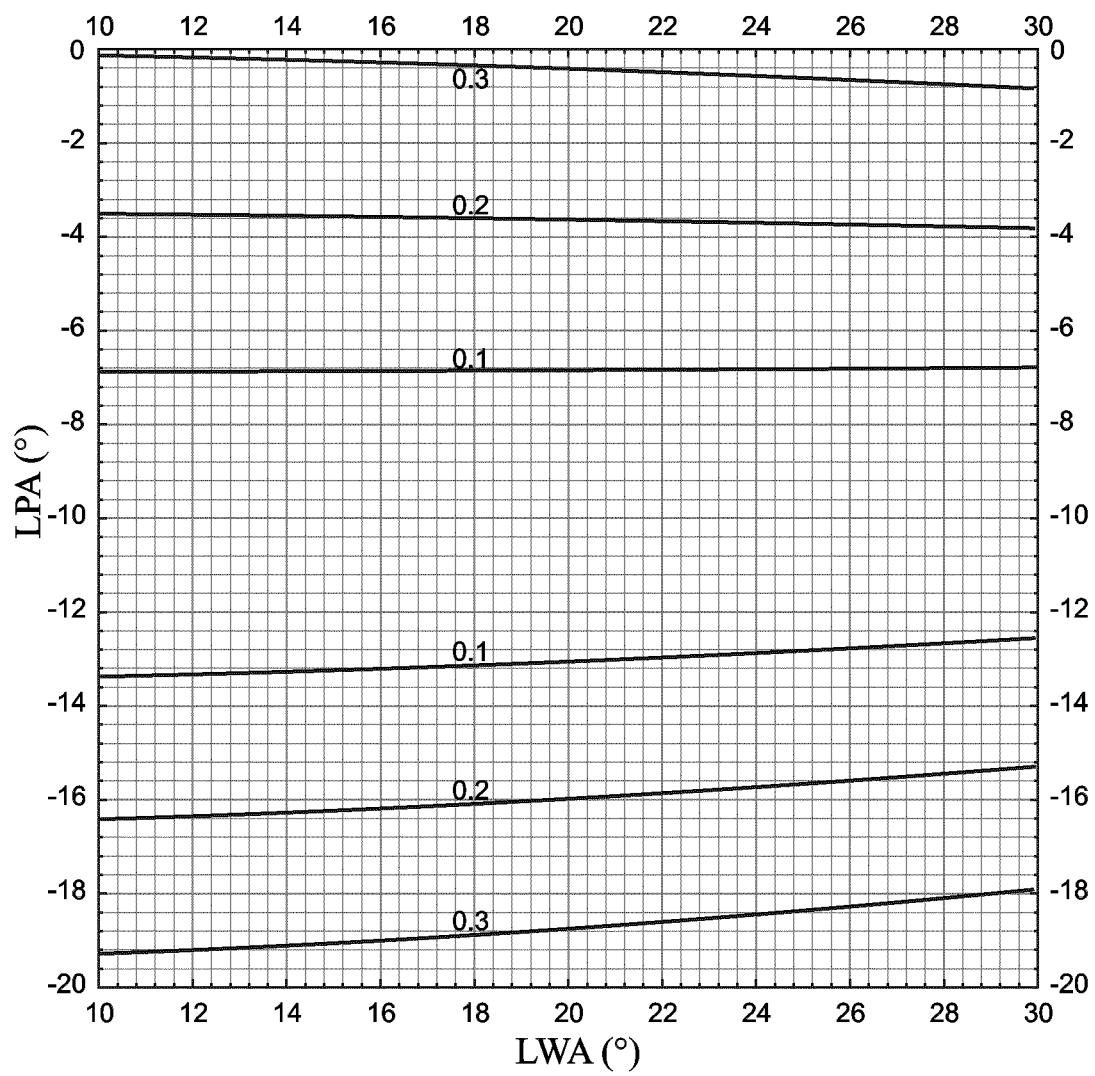

FIG. 10 shows the vertical prismatic deviation (in Prismatic Diopters) variation $VPD(0,0)$, thus the variation of the vertical prismatic deviation according to the central gaze direction, according to both the lens pantoscopic angle and the lens wrap angle. It appears from this figure that the vertical prismatic deviation according to the central gaze direction of the Reference lens varies over the lens pantoscopic angle and the lens wrap angle studied domain. It significantly increases when the lens pantoscopic angle increases and when the lens pantoscopic angle decreases. Such a performance is not fully satisfactory.

The here above results show that the Reference lens may have significant optical aberrations over the lens pantoscopic angle and the lens wrap angle studied domain corresponding to varying wearing conditions; such aberrations may be detrimental to the wearer's comfort.

In order to overcome said inconveniences, the present invention provides a selection chart which is suitable for offering non-prescription ophthalmic lenses that have enhanced visual comfort according to wearer's needs. A relevant non-prescription ophthalmic lens can then be chosen thanks to said selection chart for a given wearer in a selection domain of the selection chart where the selection domain corresponds to selected criteria. According to the present invention, each selection domain of the selection chart is associated to a single non-prescription ophthalmic lens with a spherical front surface, a complex back surface and a lens base curve; non-prescription ophthalmic lenses associated to the selection chart are thus limited to a finished number of units and have improved optical features for a wearer whatever are the chosen wearing conditions (corresponding to lens wrap angle or to lens pantoscopic angle) or chosen lens base curves.

FIGS. 11 to 16 relate to an example according to the present invention, where a set of non-prescription ophthalmic lenses is associated to a selection chart according to the present invention; said figures give optical characteristics of said non-prescription ophthalmic lenses. In said example, non-prescription ophthalmic lenses have been designed so as to have a lens base curve of 8 D.

In said example, one chooses two selection criteria (SC) which are the lens pantoscopic angle and lens wrap angle. Selection criterion ranges (SCR) are chosen for each of the said selection criteria; where: the criterion range of the lens pantoscopic angle is between 0° and −20° and the criterion range of the lens wrap angle is between +10° and +30°.

In said example, one chooses six optical performance parameters (OPP) which are following: PPO(0,0); PPO(0, 30); ASR(0,0); ASR(0,30); HPD(0,0); VDP(0,0). An optical performance parameter threshold (OPPT) is associated to each optical performance parameter (OPP), where the optical performance parameter threshold (OPPT) is 0.1 D when it is associated to either PPO(0,0); PPO(0,30); ASR(0,0); ASR(0,30), and the optical performance parameter threshold (OPPT) is 0.2 PD when it is associated to either HPD(0,0); VDP(0,0).

Thanks to the method of the present invention, one calculates selection domains (SD) defined by sub-ranges for each of the chosen selection criterion (SC) within the selection criterion range (SCR) so as to determine and associate in each selection domain (SD) a single non-prescription ophthalmic lens with a spherical front surface, a complex back surface and a lens base curve, where all the chosen optical performance parameter(s) (OPP) are equal or less to the optical performance parameter threshold (OPPT) for all values of the selection criterion (SC) within the selection domain (SD) associated to said single non-prescription ophthalmic lens.

Figure 11:
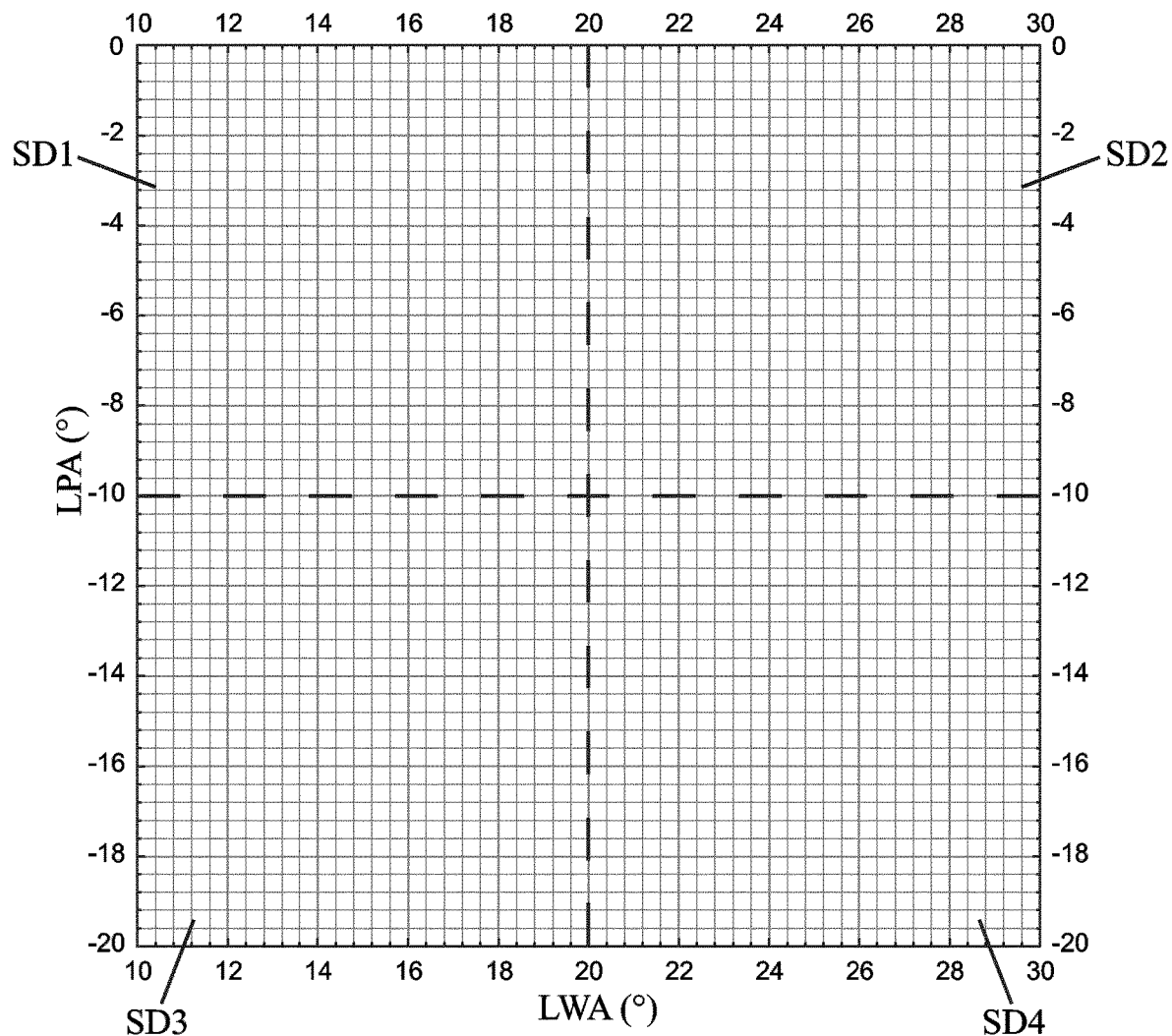
FIGS. 11 to 17 give features, namely optical characteristics, of a set of non-prescription ophthalmic lenses associated to a selection chart according the present invention.

Results are following:

As shown by FIG. 11, four selection domains (SD), SD1 to SD4, have been calculated with following sub-ranges for each of the chosen selection criterion (SC):

|  | sub-range for lens wrap angle | sub-range for lens pantoscopic angle |
| --- | --- | --- |
| SD1 | 10° to 20° | 0° to −10° |
| SD2 | 20° to 30° | 0° to −10° |
| SD3 | 10° to 20° | −10° to −20° |
| SD4 | 20° to 30° | −10° to −20° |

Figure 12:
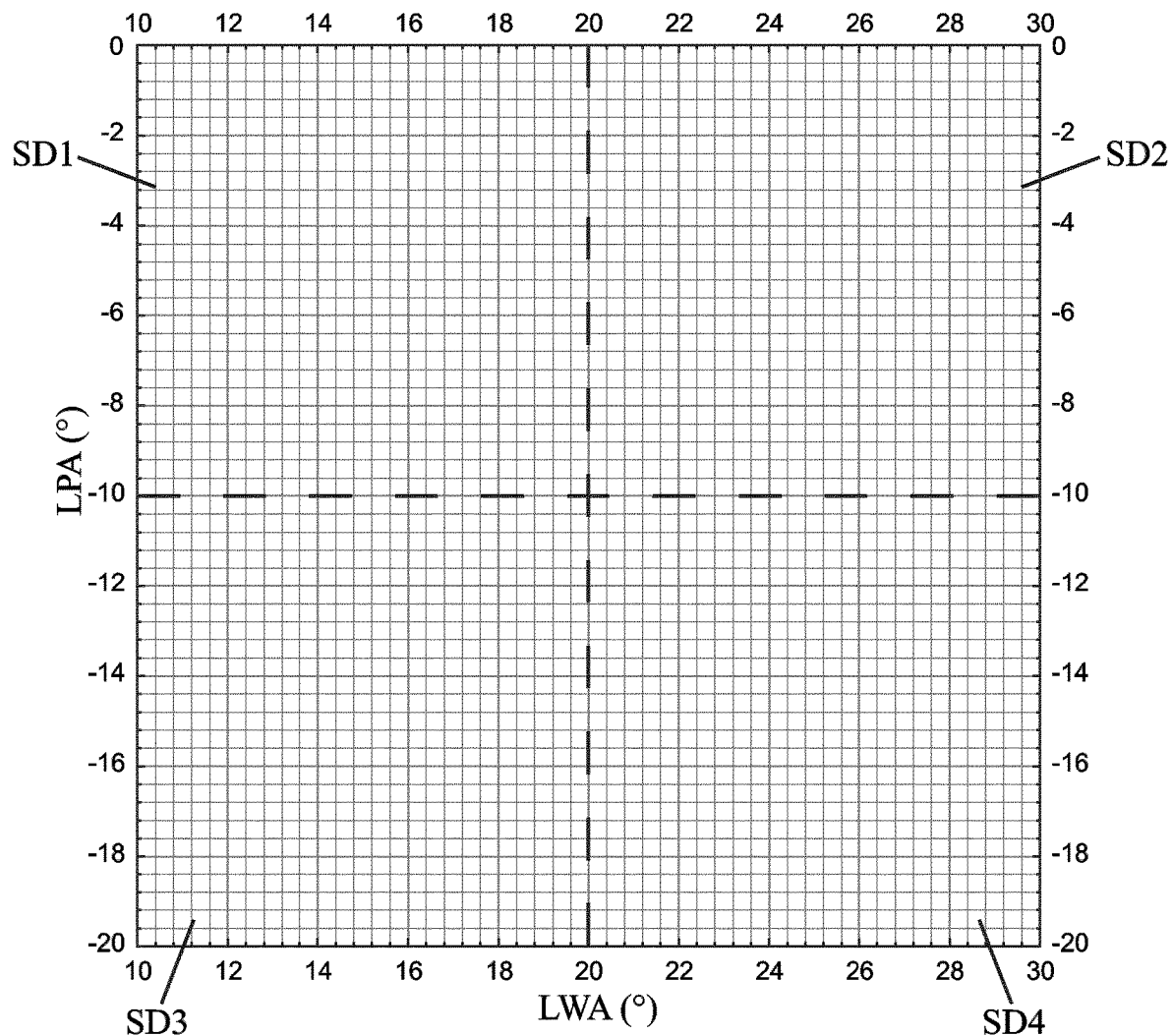

FIG. 12 shows the optical power PPO(0,0) variation, thus the variation of the optical power according to the central gaze direction, according to both the lens pantoscopic angle and the lens wrap angle, for each of the non-prescription ophthalmic lens, respectively associated to the selection domain SD1, SD2, SD3, SD4. It appears from this figure that the optical power according to the central gaze direction of the non-prescription ophthalmic lens of each selection domain is close to nil all over the lens pantoscopic angle and the lens wrap angle studied domain. All over the said domain, PPO(0,0) is less than 0.05 D. Such a performance is satisfactory.

Figure 13:
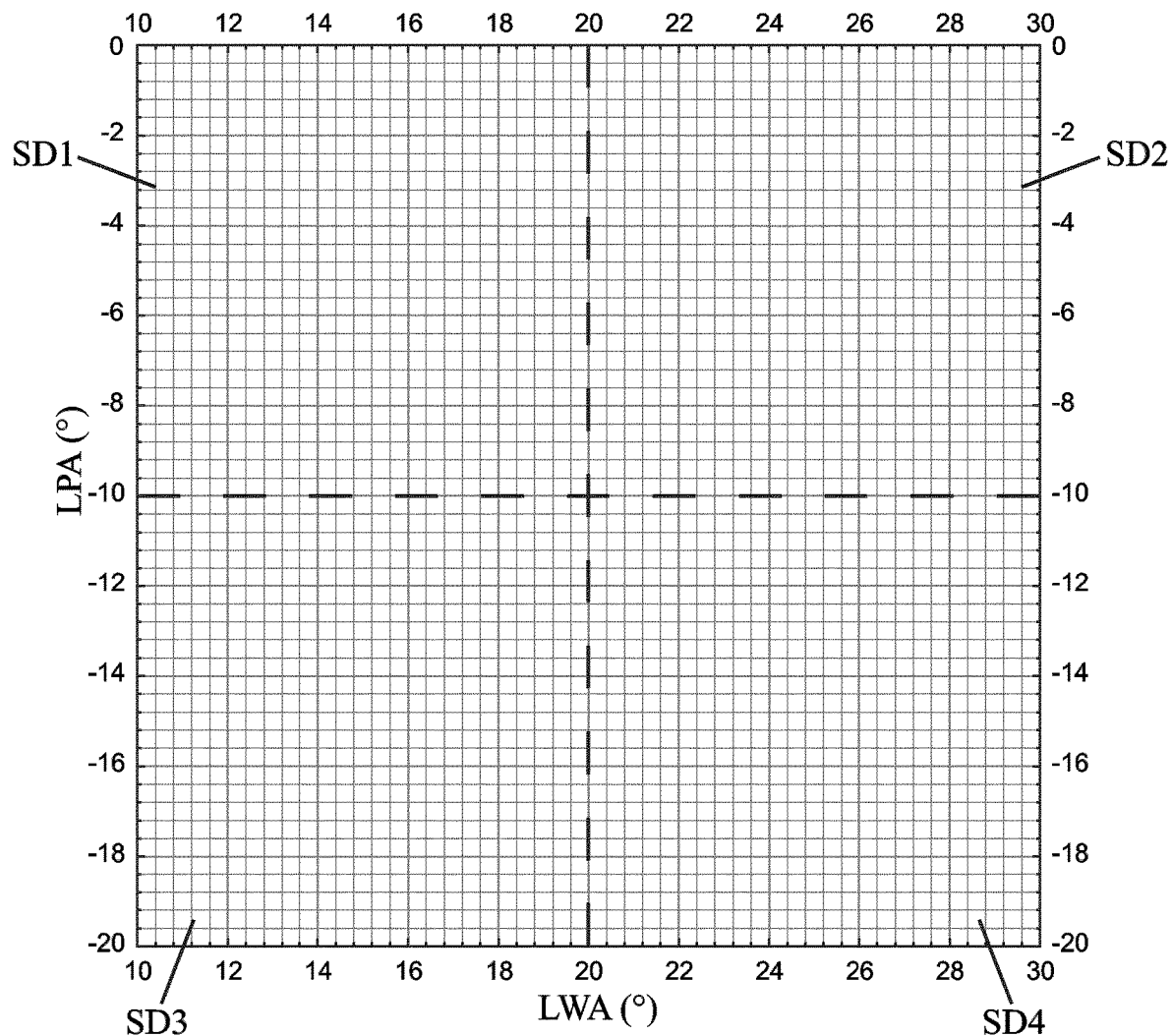

FIG. 13 shows the resulting astigmatism ASR(0,0) variation, thus the variation of the resulting astigmatism according to the central gaze direction, according to both the lens pantoscopic angle and the lens wrap angle, for each of the non-prescription ophthalmic lens, respectively associated to the selection domain SD1, SD2, SD3, SD4. It appears from this figure that the resulting astigmatism according to the central gaze direction of the non-prescription ophthalmic lens of each selection domain is close to nil all over the lens pantoscopic angle and the lens wrap angle studied domain. All over the said domain, ASR(0,0) is less than 0.05 D. Such a performance is satisfactory.

Figure 14:
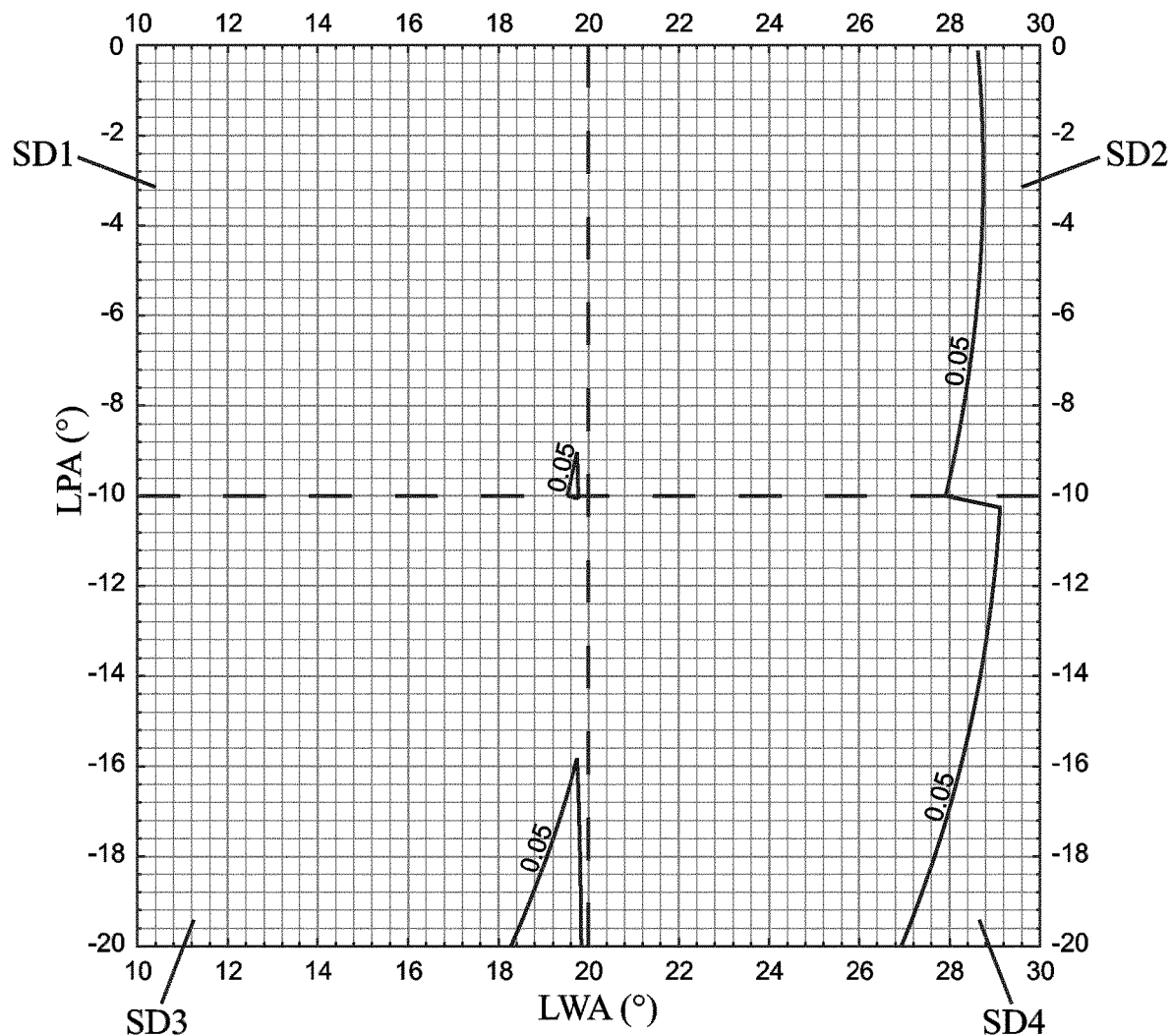

FIG. 14 shows the optical power PPO(0,30) variation, thus the variation of the optical power according to a lateral gaze direction, according to both the lens pantoscopic angle and the lens wrap angle, for each of the non-prescription ophthalmic lens, respectively associated to the selection domain SD1, SD2, SD3, SD4. It appears from this figure that the optical power according to a lateral gaze direction of the non-prescription ophthalmic lens of each selection domain is low over the lens pantoscopic angle and the lens wrap angle studied domain. All over the said domain, PPO(0,30) is less than 0.1 D. Such a performance is satisfactory.

Figure 15:
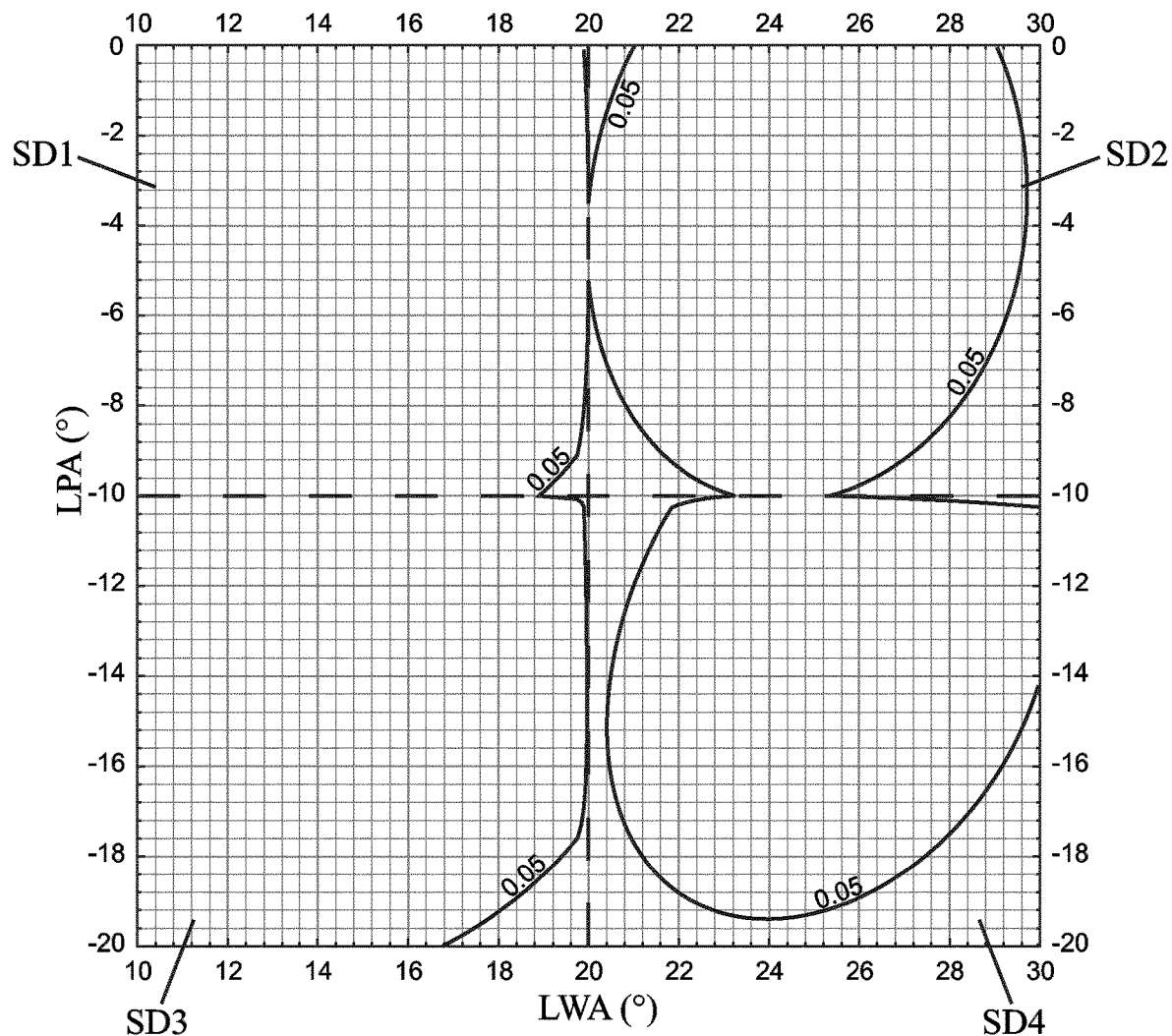

FIG. 15 shows the resulting astigmatism ASR(0,30) variation, thus the variation of the resulting astigmatism according to a lateral gaze direction, according to both the lens pantoscopic angle and the lens wrap angle, for each of the non-prescription ophthalmic lens, respectively associated to the selection domain SD1, SD2, SD3, SD4. It appears from this figure that the resulting astigmatism according to a lateral gaze direction of the non-prescription ophthalmic lens of each selection domain is low over the lens pantoscopic angle and the lens wrap angle studied domain. All over the said domain, ASR(0,30) is less than 0.1 D. Such a performance is satisfactory.

Figure 16:
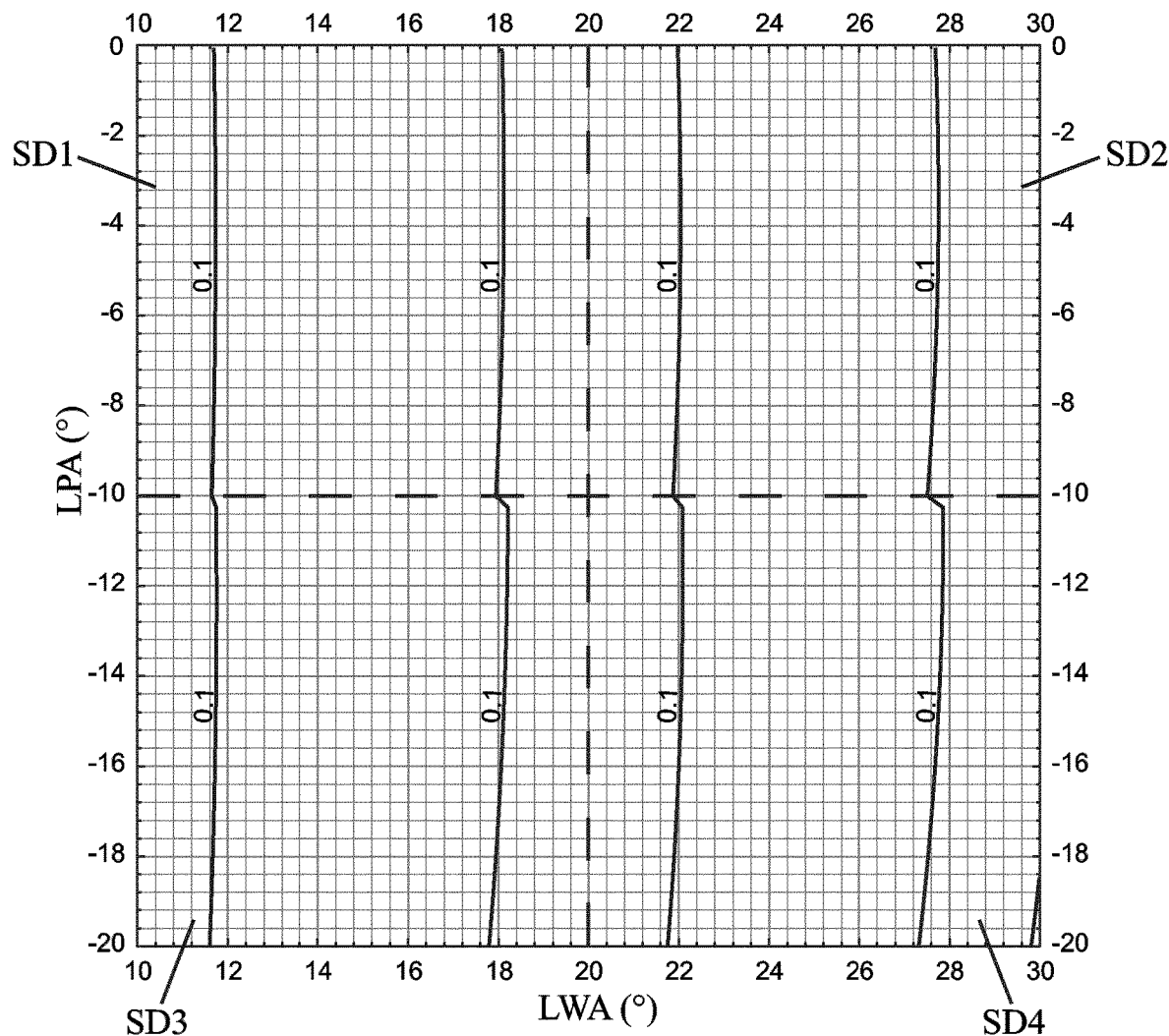

FIG. 16 shows the horizontal prismatic deviation (in Prismatic Diopters) variation HPD(0,0), thus the variation of the horizontal prismatic deviation according to the central gaze direction, according to both the lens pantoscopic angle and the lens wrap angle, for each of the non-prescription ophthalmic lens, respectively associated to the selection domain SD1, SD2, SD3, SD4. It appears from this figure that the horizontal prismatic deviation according to the central gaze direction of the non-prescription ophthalmic lens of each selection domain is low over the lens pantoscopic angle and the lens wrap angle studied domain. All over the said domain, HPD(0,0), is less than 0.2 PD. Such a performance is satisfactory.

Figure 17:
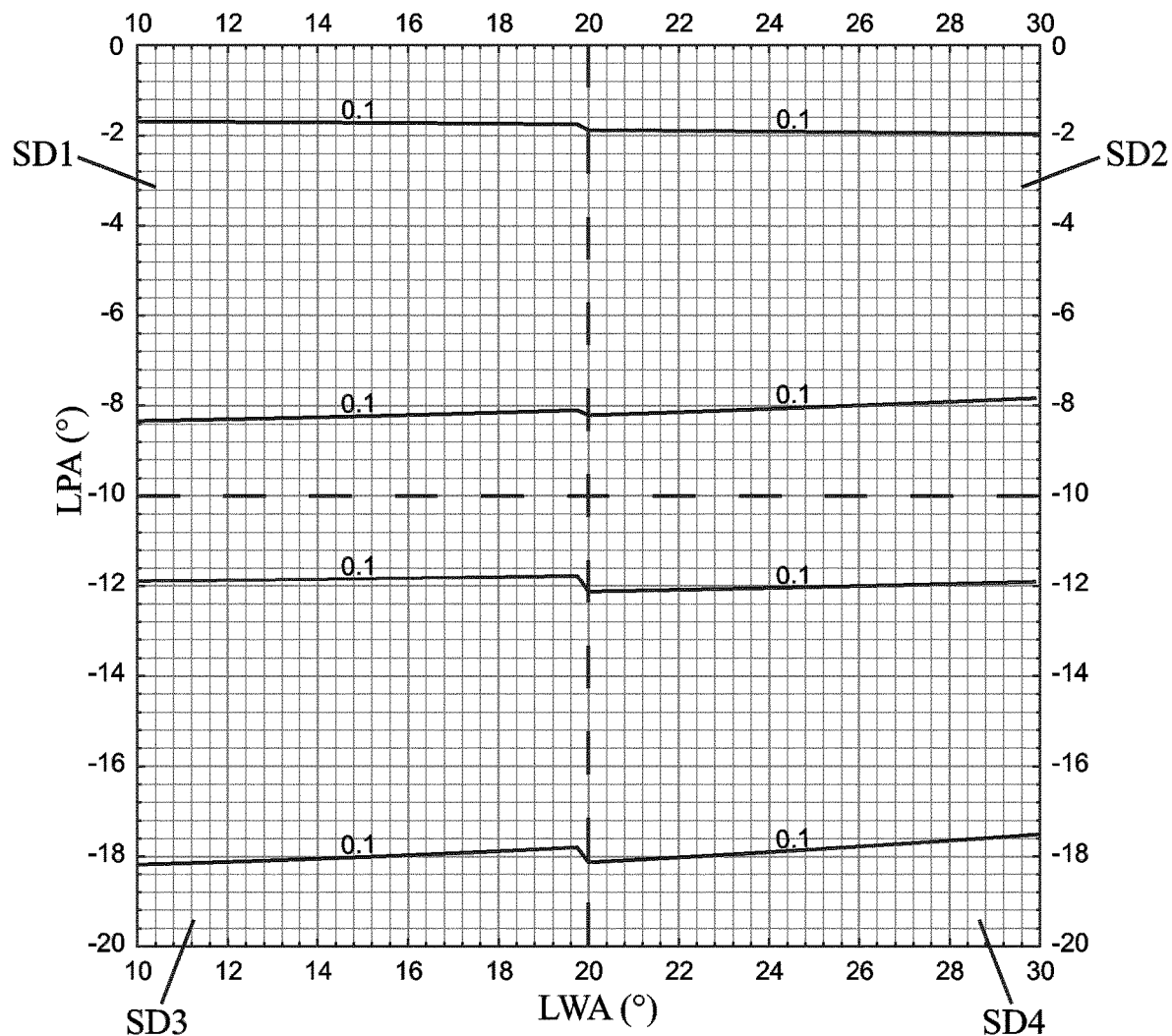

FIG. 17 shows the vertical prismatic deviation (in Prismatic Diopters) variation VPD(0,0), thus the variation of the vertical prismatic deviation according to the central gaze direction, according to both the lens pantoscopic angle and the lens wrap angle, for each of the non-prescription ophthalmic lens, respectively associated to the selection domain SD1, SD2, SD3, SD4. It appears from this figure that the vertical prismatic deviation according to the central gaze direction of the non-prescription ophthalmic lens of each selection domain is low over the lens pantoscopic angle and the lens wrap angle studied domain. All over the said domain, VPD(0,0), is less than 0.2 PD. Such a performance is satisfactory.

Those results clearly demonstrate that a set of non-prescription ophthalmic lenses associated to a selection chart provided according to the method of the present invention offers improved optical features compared to a Reference lens. Optical aberrations over the lens pantoscopic angle and the lens wrap angle studied domain corresponding to varying wearing conditions are significantly reduced thanks to said set of non-prescription ophthalmic lenses.

The present invention has been described above with the aid of an embodiment where selection criteria (SC) are two criteria which are the lens pantoscopic angle and the lens wrap angle; it can also be illustrated by embodiments where selection criteria (SC) are two criteria which are the lens base curve and the lens wrap angle; it can also be illustrated by embodiments where selection criteria (SC) are two criteria which are the lens base curve and the lens pantoscopic angle; it can also be illustrated by embodiments where selection criteria (SC) are three criteria which are the lens base curve, the lens pantoscopic angle and the lens wrap angle; it can also be illustrated by embodiments where the selection criterion (SC) is a single criterion which is one of following: lens base curve; the lens pantoscopic angle; the lens wrap angle.

The non-prescription ophthalmic lenses of the set of non-prescription ophthalmic lenses associated to the selection chart comprise marking positions for indicating a fitting point and defining a temporal and/or a nasal area.

Said non-prescription ophthalmic lenses can be manufactured thanks to a method for manufacturing comprising a step of injecting or of molding of the non-prescription ophthalmic lens of each selection domain (SD).

The present invention also relates to a method of selecting a non-prescription ophthalmic lens within a selection chart according to the present invention comprising providing geometrical features of a frame to which the non-prescription ophthalmic lens is intended to be mounted and providing rules between the geometrical features of the frame and the selection criterion(a) of the selection chart. According to an embodiment, the geometrical features of the frame are chosen within the list consisting of a frame pantoscopic angle; a frame wrap angle; a frame base curve.

In the frame of the present invention said geometrical features of a frame are defined as following:

"The base curve of the frame" is to be understood as the curvature of the closest sphere, in the least-squares sense, to the set of points of a contour of the spectacle frame. By extension a base value for the contour of the spectacle frame (Bm) expressed in diopters can be defined with: Bm=(n−1)·CURVm where n=1.53;

"The frame pantoscopic angle" is the vertical component of the angle between the "plane of the lens shape" and the "plane of the frame arms"; the "plane of the frame arms" is a plane that includes the left arms segment and the right arm segment. Arm Segment is a segment joining the fastening of the arm to the frame shape and the contact point between the arm and the ear of the wearer. In most case, frame arm have a linear/straight part extending from the frame shape to the ear, and this linear/straight part can be taken as a good approximation for segment;

"The frame wrap angle", also called the "face form angle" is horizontal component of the angle between the plane of the spectacle front and the plane of the right lens shape, or of the left lens shape; wherein the "plane of the lens shape" means the plane tangential to the front surface of a plano or demonstration or dummy lens at its boxed centre, when mounted in the frame. Preferably, a plano lens is used.

According to an embodiment, the method of selecting a lens within the selection chart where geometrical features of a frame are provided and where the geometrical features of the frame are chosen within the list consisting of a frame pantoscopic angle; a frame wrap angle; a frame base curve; comprises a step where the rules between the geometrical features of the frame and the selection criterion(a) are following:

One selects a non-prescription ophthalmic lens having a lens pantoscopic angle equal to the frame pantoscopic angle; and/or, One selects a non-prescription ophthalmic lens having a lens wrap angle equal to the frame wrap angle; and/or, One selects a non-prescription ophthalmic lens having a lens base curve equal to the frame base curve.

According to another embodiment, the method of selecting a lens within the selection chart where geometrical features of a frame are provided and where the geometrical features of the frame are chosen within the list consisting of a frame pantoscopic angle; a frame wrap angle; comprises a step where the rules between the geometrical features of the frame and the selection criterion(a) are following:

One selects a non-prescription ophthalmic lens having a lens pantoscopic angle equal to a value corresponding to the result of a correction function for the frame pantoscopic angle; and/or, One selects a non-prescription ophthalmic lens having a lens wrap angle equal to a value corresponding to the result of a correction function for the frame wrap angle.

The correction function for the frame pantoscopic angle is following:

$$lensPanto = a\sin\left[\frac{MountingHeight - Y_{YC} - \frac{\|DU\|}{2}\cos(framePanto) + \sqrt{R^2 - \frac{\|DU\|^2}{4}} \cdot \sin(framePanto)}{R}\right]$$

Figure 18:
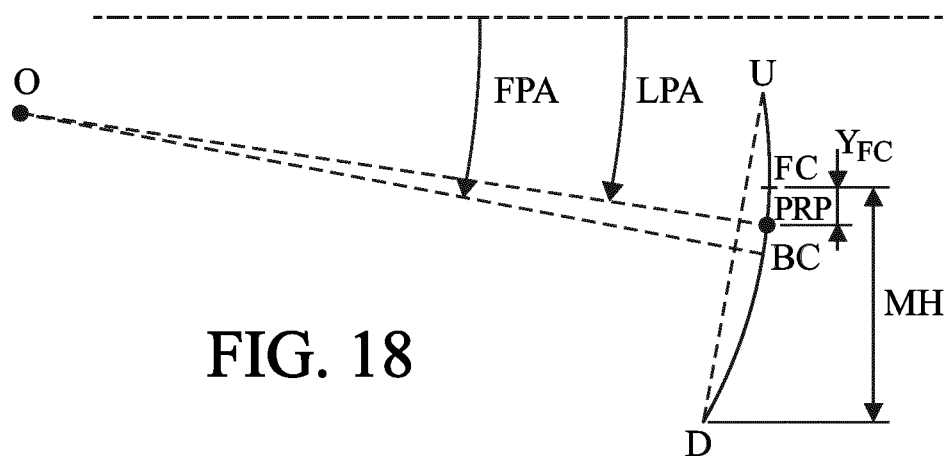
FIG. 18 shows, diagrammatically, an embodiment of relationship between a frame pantoscopic angle and a lens pantoscopic angle.

Where:
lensPanto is the result corresponding to the lens pantoscopic angle equal to a value corresponding to the result of a correction function for the frame pantoscopic angle; it is called "resulting lens pantoscopic angle";
FIG. 18 illustrates how the parameters of said equation are determined:
Resulting lens pantoscopic angle is referred as LPA;
Actual frame pantoscopic angle is referred as FPA;
R is the lens base curve;
Lens MountingHeight is referred as MH and is the vertical distance from the lens bottom to the fitting cross (expressed in mm);
$Y_{FC}$ is the y position of the fitting cross (expressed in mm) with respect to the Prism Reference Point (PRP on the figure);
DU is the distance from the upper edge of the lens to the lower edge of the lens (expressed in mm);
BC refers to the boxing center;
a sin represents the arc sinus function.

The correction function for the frame wrap angle is following:

$$lensWrap = a\sin\left[\frac{halfPD - halfDBL + x_{PC} - \frac{\|NT\|}{2}\cos(frameWrap) + \sqrt{R^2 - \frac{\|NT\|^2}{4}} \cdot \sin(frameWrap)}{R}\right]$$

Figure 19:
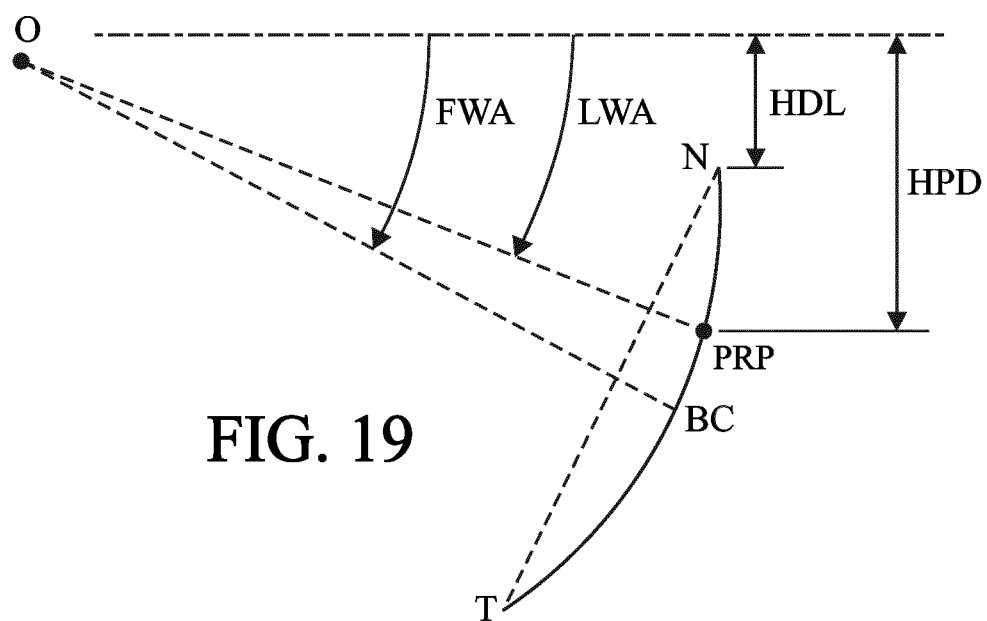
FIG. 19 shows, diagrammatically, an embodiment of relationship between a frame wrap angle and a lens wrap angle.

Where:
lensWrap is the result corresponding to the lens wrap angle equal to a value corresponding to the result of a correction function for the frame wrap angle; it is called "resulting lens wrap angle";
FIG. 19 illustrates how the parameters of said equation are determined:
Resulting lens wrap angle is referred as LWA;
Actual frame wrap angle is referred as FWA;

halfPD is referred as HPD and is the half pupillary distance (expressed in mm);

halfDBL is referred as HDL and is the half distance (expressed in mm) between lenses mounted in a spectacle frame;

$x_{FC}$ is the x position of the fitting cross (expressed in mm) with respect to the Prism Reference Point (PRP on the figure);

NT is the distance from the nasal edge of the lens to the temporal edge of the lens (expressed in mm);

a sin represents the arc sinus function.

The invention has been described above with the aid of embodiments without limitation of the general inventive concept.

The invention claimed is:

1. A method for manufacturing non-prescription ophthalmic lenses comprising:
   providing a selection chart of non-prescription ophthalmic lenses, implemented by a computer, according to at least a selection criterion (SC);
   providing at least one optical performance parameter threshold (OPPT) associated to an optical performance parameter (OPP);
   choosing the selection criterion (SC) among selection criteria of a list consisting of: lens base curve, lens pantoscopic angle, and lens wrap angle;
   choosing a selection criterion range (SCR) for each of the chosen selection criterion;
   calculating selection domains (SD) defined by sub-ranges for each of the chosen selection criterion (SC) within the selection criterion range (SCR) to determine and associate in each selection domain (SD) a single non-prescription ophthalmic lens with a spherical front surface, a complex back surface and a lens base curve, where all chosen optical performance parameter (OPP) are equal or less to the optical perfoiniance parameter threshold (OPPT) for all values of the selection criterion (SC) within the selection domain (SD) associated to said single non-prescription ophthalmic lens, and
   injecting or molding at least one of the determined non-prescription ophthalmic lens.

2. The method as claimed in claim 1, according to which optical performance parameters (OPP) are chosen within the list consisting of: PPO(0,0); PPO(0,30); ASR(0,0); ASR(0,30); HPD(0,0); VDP(0,0); where PPO($\alpha,\beta$) is mean refractive power, ASR($\alpha,\beta$) is module of resulting astigmatism, HPD($\alpha,\beta$) is horizontal prismatic deviation (in Prismatic Diopters) and VPD($\alpha,\beta$) is vertical prismatic deviation (in Prismatic Diopters), said ($\alpha,\beta$) functions being determined in as-worn conditions of the lens by a wearer for gaze directions ($\alpha,\beta$) joining the center of rotation of an eye, CRE, and the lens, where $\alpha$ is a lowering angle in degree and $\beta$ is an azimuth angle in degree and where as-worn conditions refer at least to a lens pantoscopic angle and/or a lens wrap angle.

3. The method as claimed in claim 2, according to which the optical performance parameter threshold (OPPT) is 0.1 D when it is associated to either PPO(0,0); PPO(0.30); ASR(0,0); ASR(0,30), and the optical performance parameter threshold (OPPT) is 0.2 PD when it is associated to either HPD(0,0); VDP(0,0).

4. The method for as claimed in claim 1, according to which the lens base curve is not a selection criterion, wherein a reference lens base curve value is provided and the selection domains (SD) are calculated so that a difference between the lens base curve of the single non-prescription ophthalmic lens in each selection domain (SD) and the reference lens base curve value is less than or equal to 2 diopters, for example is less than or equal to 1 diopter.

5. The method for as claimed in claim 1, according to which the selection criterion range (SCR) for a selection criterion is chosen according to following rules:
   3D to 9 D when the selection criterion is a lens base curve;
   −20° to 0° when the selection criterion is the lens pantoscopic angle;
   10° to 30° when the selection criterion is the lens wrap angle.

6. The method for as claimed in claim 1, according to which the selection domains (SD) calculating comprises an optimization routine for determining the minimum number of selection domains that fulfil required conditions and simultaneously determining the front surface and the complex back surface of the single non-prescription ophthalmic lens in each selection domain (SD).

7. The method for as claimed in claim 1, according to which data are associated to the non-prescription ophthalmic lenses of the selection domains so as to provide marking positions for indicating a fitting point and defining a temporal and/or a nasal area.

8. A method of selecting a non-prescription ophthalmic lens within the selection chart provided by claim 1 comprising providing geometrical features of a frame to which the non-prescription ophthalmic lens is intended to be mounted and providing rules between the geometrical features of the frame and the selection criterion of the selection chart.

9. The method of selecting a lens within the selection chart as claimed in claim 8, according to which the geometrical features of the frame are chosen within the list consisting of a frame pantoscopic angle; a frame wrap angle; and a frame base curve.

10. The method of selecting a lens within the selection chart as claimed in claim 9, according to which the rules between the geometrical features of the frame and the selection criterion(a) are following:
    One selects a non-prescription ophthalmic lens having a lens pantoscopic angle equal to the frame pantoscopic angle; and/or,
    One selects a non-prescription ophthalmic lens having a lens wrap angle equal to the frame wrap angle; and/or,
    One selects a non-prescription ophthalmic lens having a lens base curve equal to the frame base curve.

11. A computer program product comprising one or more stored sequence of instruction that is accessible to a processor and which, when executed by the processor, causes the processor to carry out the method of claim 1.

12. A computer-readable medium carrying one or more sequences of instructions of the computer program product of claim 11.

13. A set of non-prescription ophthalmic lenses with a spherical front surface, a complex back surface and a lens base curve associated to a selection chart, wherein the selection chart comprises at least one selection criterion (SC) among selection criteria of the list consisting of: lens base curve; lens pantoscopic angle; and lens wrap angle;
   wherein a selection criterion range (SCR) is provided for each selection criterion (SC) and selection domains (SD) are provided within the selection criterion range as a single non-prescription ophthalmic lens is associated to each of the selection domains.

14. The set of non-prescription ophthalmic lenses as claimed in claim 13, according to which each non-prescription ophthalmic lens fulfils at least a chosen optical performance parameter (OPP) which is (are) equal or less to an optical performance parameter threshold (OPPT) for all values of the selection criterion within the selection domain (SD) associated to each of the single non-prescription ophthalmic lenses.

\* \* \* \* \*